United States Patent Office 3,131,166
Patented Apr. 28, 1964

---

3,131,166
2-PHENOXYETHYL VINYL ETHERS AND POLYMERIZATION PRODUCTS THEREOF
Thomas M. Harris, South Charleston, and John W. Lynn, Charleston, W. Va., assignors to Union Carbide Corporation, a corporation of New York
No Drawing. Filed Dec. 27, 1960, Ser. No. 78,273
3 Claims. (Cl. 260—47)

This invention relates to novel 2-phenoxyethyl vinyl ethers, to processes for their production, and to the polymerization of these compounds.

The novel 2-phenoxyethyl vinyl ethers of the instant invention can be depicted by the general formula:

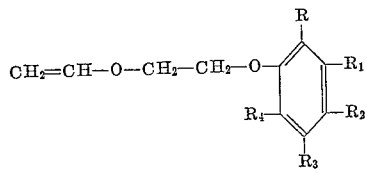

wherein R, $R_1$, $R_2$, $R_3$, and $R_4$ are members selected from the group consisting of hydrogen, halogen radicals, including fluorine, chlorine, bromine and iodine radicals; alkyl radicals having from 1 to 18 carbon atoms, preferably from 1 to 9 carbon atoms; and alkoxy radicals having from 1 to 18 carbon atoms, preferably from 1 to 9 carbon atoms. Illustrative of the 2-phenoxyethyl vinyl ethers of the instant invention are such compounds as 2-(2',4'-dichlorophenoxy)ethyl vinyl ether,
2-(2',4'-difluorophenoxy)ethyl vinyl ether,
2-(2',4'-dibromophenoxy)ethyl vinyl ether,
2-(2',4'-diiodophenoxy)ethyl vinyl ether,
2-(2',4',5'-trichlorophenoxy)ethyl vinyl ether,
2-(2',4',5'-trifluorophenoxy)ethyl vinyl ether,
2-(2',4',5'-tribromophenoxy)ethyl vinyl ether,
2-(2',4',5'-triiodophenoxy)ethyl vinyl ether,
2-(3',5'-dimethylphenoxy)ethyl vinyl ether,
2-(3',5'-diethylphenoxy)ethyl vinyl ether,
2-(3',5'-diisopropylphenoxy)ethyl vinyl ether,
2-(3',5'-diisobutylphenoxy)ethyl vinyl ether,
2-(3',5'-diamylphenoxy)ethyl vinyl ether,
2-(3',5'-di-n-hexylphenoxy)ethyl vinyl ether,
2-(3',5'-di-n-nonylphenoxy)ethyl vinyl ether,
2-(3',5'-didodecylphenoxy)ethyl vinyl ether,
2-(3',5'-dioctadecylphenoxy)ethyl vinyl ether,
2-(4'-n-nonylphenoxy)ethyl vinyl ether,
2-(4'-dodecylphenoxy)ethyl vinyl ether,
2-(4'-octadecylphenoxy)ethyl vinyl ether,
2-(4'-methylphenoxy)ethyl vinyl ether,
2-(4'-ethylphenoxy)ethyl vinyl ether,
2-(4'-isopropylphenoxy)ethyl vinyl ether,
2-(4'-isobutylphenoxy)ethyl vinyl ether,
2-(4'-amylphenoxy)ethyl vinyl ether,
2-(4'-n-hexylphenoxy)ethyl vinyl ether,
2-(2',4'-dimethoxyphenoxy)ethyl vinyl ether,
2-(2',4'-diethoxyphenoxy)ethyl vinyl ether,
2-(2',4'-diisopropoxyphenoxy)ethyl vinyl ether,
2-(2',4'-diisobutoxyphenoxy)ethyl vinyl ether,
2-(2',4'-didodecoxyphenoxy)ethyl vinyl ether,
2-(2',4'-dioctadecoxyphenoxy)ethyl vinyl ether,
2-(2',4',5'-trimethoxyphenoxy)ethyl vinyl ether,
2-(2',4',5'-triethoxyphenoxy)ethyl vinyl ether,
2-(2',4',5'-triisopropoxyphenoxy)ethyl vinyl ether,
2-(2',4',5'-triisobutoxyphenoxy)ethyl vinyl ether,
2-(2',4',5'-tridodecoxyphenoxy)ethyl vinyl ether,
2-(2',4',5'-trioctadecoxyphenoxy)ethyl vinyl ether,
2-(3',5'-dimethoxyphenoxy)ethyl vinyl ether,
2-(3',5'-diethoxyphenoxy)ethyl vinyl ether,
2-(3',5'-diisopropoxyphenoxy)ethyl vinyl ether,
2-(3',5'-diisobutoxyphenoxy)ethyl vinyl ether,
2-(3',5'-didodecoxyphenoxy)ethyl vinyl ether,
2-(3',5'-dioctadecoxyphenoxy)ethyl vinyl ether,
2-(4'-methoxyphenoxy)ethyl vinyl ether,
2-(4'-ethoxyphenoxy)ethyl vinyl ether,
2-(4'-isopropoxyphenoxy)ethyl vinyl ether,
2-(4'-isobutoxyphenoxy)ethyl vinyl ether,
2-(4'-dodecoxyphenoxy)ethyl vinyl ether,
2-(4'-octadecoxyphenoxy)ethyl vinyl ether,
2-(2'-chloro-4'-methylphenoxy)ethyl vinyl ether,
2-(2'-chloro-4'-methoxyphenoxy)ethyl vinyl ether,
2-(2'-methyl-4'-methoxyphenoxy)ethyl vinyl ether,
2-(2'-bromo-4',5'-diethylphenoxy)ethyl vinyl ether,
2-(2'-bromo-4',5'-diisopropoxyphenoxy)ethyl vinyl ether,
2-(2'-chloro-4',5'-di-n-nonylphenoxy)ethyl vinyl ether,
2-(2'-ethoxy-4',5'-di-n-nonylphenoxy)ethyl vinyl ether,
2-(3'-ethoxy-5'-methoxyphenoxy)ethyl vinyl ether,
2-(3'-chloro-5'-n-nonylphenoxy)ethyl vinyl ether, and the like.

The novel 2-phenoxyethyl vinyl ethers of the instant invention can be produced by the reaction of a suitable phenol with a 2-haloethyl vinyl ether in the presence of a strongly alkaline condensation agent.

The phenols which can be employed as starting materials in preparing the novel 2-phenoxyethyl vinyl ethers of the instant invention can be depicted by the general formula:

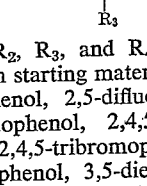

wherein R, $R_1$, $R_2$, $R_3$, and $R_4$ are as above defined. Illustrative of such starting materials are such compounds as 2,4-dichlorophenol, 2,5-difluorophenol, 2,5-dibromophenol, 2,4-diiodophenol, 2,4,5-trichlorophenol, 2,4,5-trifluorophenol, 2,4,5-tribromophenol, 2,4,5-triiodophenol, 3,5-dimethylphenol, 3,5-diethylphenol, 3,5-diisopropylphenol, 3,5-diisobutylphenol, 3,5-diamylphenol, 3,5-di-n-hexylphenol, 3,5-di-n-nonylphenol, 3,5-didodecylphenol, 3,5-dioctadecylphenol, 4-n-nonylphenol, 4-methylphenol, 4-ethylphenol, 4-isopropylphenol, 4-isobutylphenol, 4-amylphenol, 4-n-hexylphenol, 4-dodecylphenol, 4-octadecylphenol, 2,4-dimethoxyphenol, 2,4-diethoxyphenol, 2,4-diisopropoxyphenol, 2,4-diisobutoxyphenol, 2,4-didodecoxyphenol, 2,4-dioctadecoxyphenol, 2,4,5-trimethoxyphenol, 2,4,5-triethoxyphenol, 2,4,5-triisopropoxyphenol, 2,4,5-triisobutoxyphenol, 2,4,5-tridodecoxyphenol, 2,4,5-trioctadecoxyphenol, 3,5-dimethoxyphenol, 3,5-diethoxyphenol, 3,5-diisopropoxyphenol, 3,5-diisobutoxyphenol, 3,5-didodecoxyphenol, 3,5-dioctadecoxyphenol, 4-methoxyphenol, 4-ethoxyphenol, 4-isopropoxyphenol, 4-isobutoxyphenol, 4-dodecoxyphenol, 4-octadecoxyphenol, 2-chloro-4-methylphenol, 2-chloro-4-methoxyphenol, 2-methyl-4-methoxyphenol, 2-bromo-4,5-diethylphenol, 2-bromo-4,5-diisopropoxyphenol, 2-chloro-4,5-di-n-nonylphenol, 2-ethoxy-4,5-di-n-nonylphenol, 3-ethoxy-5-methoxyphenol, 3-chloro-5-n-nonylphenol, and the like.

The 2-haloethyl vinyl ethers which can be employed as starting materials in preparing the novel 2-phenoxyethyl vinyl ethers of the instant invention can be depicted by the general formula:

$$CH_2=CH-O-CH_2-CH_2-X$$

wherein X is a halogen radical, including fluorine, chlorine, bromine and iodine radicals.

The process of the instant invention, which comprises reacting a phenol with a 2-haloethyl vinyl ether in the presence of a strongly alkaline condensation agent, can be illustrated by the following graphic equation:

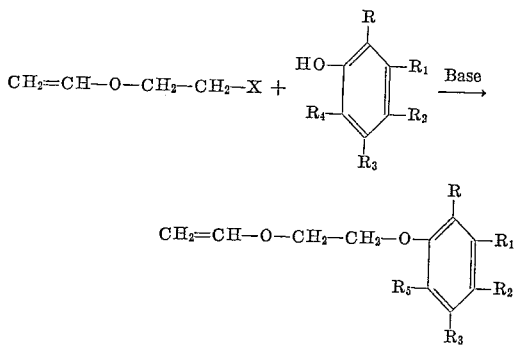

wherein R, $R_1$, $R_2$, $R_3$, $R_4$, and X are as above defined. By way of illustration, 2-(2',4'-dichlorophenoxy)ethyl vinyl ether can be prepared by the reaction of 2,4-dichlorophenol with 2-chloroethyl vinyl ether, and 2-(4'-nonylphenoxy)ethyl vinyl ether can be prepared by the reaction of 4-nonylphenol with 2-chloroethyl vinyl ether.

Since one mole of phenol reacts with one mole of 2-haloethyl vinyl ether to produce one mole of 2-phenoxyethyl vinyl ether, it is preferable to employ equimolar amounts of these reactants when effecting reaction according to the process of the instant invention; however, an excess of either reactant, up to about 2 times the stoichiometric equivalent, can also be employed whenever it is desirable to do so.

In order to effect reaction between a phenol and a 2-haloethyl vinyl ether according to the process of the instant invention, the presence of a strongly alkaline condensation agent in the reaction mixture is necessary. Such strongly alkaline condensation agents include the oxides, hydroxides, amides and alcoholates of the alkali or alkaline earth metals, as well as the alkali or alkaline earth metals themselves, and such strongly basic non-metallic hydroxides as the quaternary ammonium hydroxides. Specific examples of the condensation agents which can be employed include sodium hydroxide, potassium hydroxide, lithium hydroxide, calcium hydroxide, sodium oxide, sodamide, potassium ethylate, potassium tertiary amylate, trimethylbenzylammonium hydroxide, benzyltriethylammonium hydroxide, and dimethyldibenzylammonium hydroxide.

Since the strongly alkaline compound serves as a condensation agent, a stoichiometric amount of such compound is necessary to effect full condensation between the phenol and the 2-haloethyl vinyl ether. If less than the stoichiometric amount of the strongly alkaline compound is employed, reaction between the phenol and the 2-haloethyl vinyl ether will be incomplete. An amount greater than the stoichiometric amount is unnecessary, but can be employed if desired.

Reaction according to the process of the instant invention readily occurs at temperatures ranging from as low as 30° C. to as high as 200° C., but is preferably effected at temperatures ranging from about 30° C. to about 150° C.

Atmospheric pressure is usually employed in effecting reaction according to the process of the instant invention. However, pressures both above and below atmospheric pressure, for example pressures ranging from as low as 100 mm. Hg to as high as 7600 mm. Hg, can also be employed whenever it is desirable to do so.

Reaction according to the process of the instant invention may be effected in an inert liquid solvent. By an "inert liquid solvent" is meant a liquid solvent in which the starting materials are soluble to an extent whereby they are brought into reactive contact and which itself is essentially nonreactive under the conditions of the reaction. Suitable inert liquid solvents which can be employed include hydrocarbons such as hexane, cyclohexane, heptane, benzene, toluene and the like, ethers such as isopropyl ether, ethyl ether, dioxane, tetrahydrofuran and the like, and alcohols such as methanol, isopropanol, isobutanol and the like. In general, an amount of solvent ranging from 0 to 20 times, preferably from 0 to 5 times, the weight of reactants present can be effectively employed.

The 2-phenoxyethyl vinyl ethers of the instant invention have been found to have a high degree of biological activity and can be used as herbicides. Because of the vinyl group present therein, these compounds can also be readily homopolymerized, or interpolymerized with one or more polymerizable organic compounds, such as styrene, butadiene, methyl acrylate, methyl methacrylate, vinyl acetate, vinyl chloride, vinylidene chloride, acrylonitrile, methacrylonitrile, vinylidene cyanide, acrylamide, methacrylamide, maleic anhydride, N-vinylacetamide, vinyl methyl ether and the like. The polymeric materials produced by polymerizing the novel 2-phenoxyethyl vinyl ethers of the instant invention can be used to form films, fibers and coatings.

Polymerization of the novel 2-phenoxyethyl vinyl ethers of the instant invention can be effected by means of heat, light, or a suitable vinyl polymerization catalyst. Preferably, polymerization is effected by heating in the presence of a polymerization catalyst in order to shorten the reaction time. Temperatures ranging from as low as 30° C. to as high as 150° C. are generally effective for this purpose. Lewis type acids, such as boron trifluoride, aluminum trichloride and stannic chloride, are suitable catalysts for effecting homopolymerization of the 2-phenoxyethyl vinyl ethers of the instant invention, while peroxides and azo compounds are suitable catalysts for effecting copolymerization of such compounds and other polymerizable organic compounds. Among the peroxides which can be employed as catalysts may be mentioned hydrogen peroxide, barium peroxide, magnesium peroxide, diethyl peroxide, distearyl peroxide, acetyl peroxide, stearoyl peroxide and acetyl benzoyl peroxide. Illustrative examples of azo compounds which can be employed as catalysts include $\alpha,\alpha'$-azo-bis-isobutyronitrile, 2,2-dicyano-bis-azobenzene, and the like.

If desired, polymerization of 2-phenoxyethyl vinyl ethers can be effected in an emulsion or in a solution of the starting monomers. Good results are obtained by effecting polymerization in an inert liquid diluent such as acetonitrile, acetone, benzene, toluene, xylene and the like.

The interpolymers obtained by interpolymerizing the novel 2-phenoxyethyl vinyl ethers of the instant invention can contain from as low as 0.1 molar percent to as high as 50 molar percent of combined 2-phenoxyethyl vinyl ether.

The following examples are set forth for purposes of illustration so that those skilled in the art may better understand this invention, and it should be understood that they are not to be construed as limiting this invention in any manner.

EXAMPLE I

*Preparation of 2-(2',4'-Dichlorophenoxy)Ethyl Vinyl Ether*

An admixture of 350 grams of 2,4-dichlorophenol (2.15 moles), 142 grams of potassium hydroxide (2.15 moles) and 700 milliliters of isopropanol was prepared and stirred while 450 grams of 2-chloroethyl vinyl ether (4.3 moles) were rapidly added thereto. After the addition of the 2-chloroethyl vinyl ether was completed, the resulting mixture was heated at its refluxing temperature for 24 hours. At the end of this time, the mixture was filtered to remove precipitated potassium chloride, and the filtrate obtained thereby was distilled at atmospheric pressure to remove isopropanol. About 400 milliliters of benzene were added to the residue, and the resulting mixture was filtered. The filtrate obtained thereby was distilled, and 313 grams of 2-(2',4'-dichlorophenoxy)-ethyl vinyl ether, boiling at a temperature of 86° C. to 93° C. at 0.10 mm. Hg pressure, were collected. This represented a yield of about 63 percent of theoretical. The product had an index of refraction of 1.5434 at 30° C., and was identified as 2-(2',4'-dichlorophenoxy)ethyl vinyl ether by its infrared absorption spectrum and elemental analysis.

Analysis.— Calculated for $C_{10}H_{10}Cl_2O_2$: C, 51.51%; H, 4.32%; Cl, 30.43%. Found: C, 51.95%; H, 4.18%; Cl, 30.13%.

EXAMPLE II

Preparation of 2-(3',5'-Dimethylphenoxy)Ethyl Vinyl Ether

An admixture of 244 grams of 3,5-dimethylphenol (2 moles), 142 grams of potassium hydroxide (2.15 moles) and 700 milliliters of isopropanol was prepared and stirred while 450 grams of 2-chloroethyl vinyl ether (4.3 moles) were rapidly added thereto. After the addition of the 2-chloroethyl vinyl ether was completed, the resulting mixture was heated at its refluxing temperature for 24 hours. At the end of this time, the mixture was filtered to remove precipitated potassium chloride, and the filtrate obtained thereby was distilled at atmospheric pressure to remove isopropanol. About 400 milliliters of benzene were added to the residue, and the resulting mixture was filtered. The filtrate obtained thereby was distilled, and 224 grams of 2-(3',5'-dimethylphenoxy)-ethyl vinyl ether, boiling at a temperature of 63° C. to 67° C. at 0.08 mm. Hg pressure were collected. This represented a yield of about 60 percent of theoretical. The product had an index of refraction of 1.5112 at 30° C., and was identified as 2-(3',5'-dimethylphenoxy)ethyl vinyl ether by its infrared absorption spectrum and elemental analysis.

Analysis.—Calculated for $C_{12}H_{16}O_2$: C, 74.96%; H, 8.39%. Found: C, 74.71%; H, 8.14%.

EXAMPLE III

Preparation of 2-(2',4',5'-Trichlorophenoxy)Ethyl Vinyl Ether

An admixture of 395 grams of 2,4,5-trichlorophenol (2.0 moles), 120 grams of potassium hydroxide (2.15 moles) and 700 milliliters of isobutanol was prepared and stirred while 426 grams of 2-chloroethyl vinyl ether (4 moles) were rapidly added thereto. After the addition of the 2-chloroethyl vinyl ether was completed, the resulting mixture was heated at its refluxing temperature for 24 hours. At the end of this time, the mixture was filtered to remove precipitated potassium chloride, and the filtrate obtained thereby was distilled at atmospheric pressure to remove isopropanol. About 400 milliliters of benzene were added to the residue, and the resulting mixture was filtered. The filtrate obtained thereby was distilled, and 118 grams of 2-(2',4',5'-trichlorophenoxy)-ethyl vinyl ether, boiling at a temperature of 90° C. to 92° C. at 0.08 mm. Hg pressure, were collected. This represented a yield of about 31 percent of theoretical. The product had an index of refraction of 1.5587 at 30° C., and was identified as 2-(2',4',5'-trichlorophenoxy)-ethyl vinyl ether by its infrared absorption spectrum and elemental analysis.

Analysis.—Calculated for $C_{10}H_9Cl_3O_2$: C, 44.87%; H, 3.39%; Cl, 39.77%. Found: C, 45.13%; H, 3.51%; Cl, 38.69%.

EXAMPLE IV

Preparation of 2-(4'-Nonylphenoxy)Ethyl Vinyl Ether

An admixture of 220 grams of 4-nonylphenol (1 mole), 60 grams of potassium hydroxide (1.07 moles) and 500 milliliters of isopropanol was prepared and stirred until the temperature of the mixture began to fall. At the end of this time, 116 grams of 2-chloroethyl vinyl ether (1.1 moles) were rapidly added to the mixture. The resulting mixture was heated at its refluxing temperature for six hours. Isopropanol was then removed from the mixture by distillation at atmospheric pressure. Benzene was then added to the remaining residue, and the resulting mixture was washed with a dilute aqueous solution of potassium hydroxide (to remove suspended salts and unreacted 4-nonylphenol). The washed solution was then distilled, and 146 grams of 2-(4'-nonylphenoxy)ethyl vinyl ether, boiling at a temperature of 102° C. to 124° C. at 0.12–0.22 mm. Hg pressure, were recovered. This represented a yield of about 50 percent of theoretical. The product had an index of refraction of 1.5001–1.5026 at 30° C., and was identified as 2-(4'-nonylphenoxy)ethyl vinyl ether by its infrared absorption spectrum and elemental analysis.

Analysis.—Calculated for $C_{19}H_{30}O_2$: C, 78.57%; H, 10.41%. Found: C, 78.75%; H, 10.58%.

EXAMPLE V

Copolymerization of 2-(2',4'-Dichlorophenoxy)Ethyl Vinyl Ether With Vinyl Chloride To a nitrogen-purged 375-milliliter Pyrex polymerization bottle were charged 50 grams of 2-(2',4'-dichlorophenoxy)ethyl vinyl ether, 100 grams of anhydrous acetone and 1.0 gram of azo-bis-isobutyronitrile. After purging the bottle with nitrogen, the bottle was cooled in an ice-water-acetone bath. Following this, 50 grams of vinyl chloride were added thereto. The bottle was then capped and rocked in a water bath maintained at a temperature of 50° C. until about 50 percent of the monomer charge had polymerized. At the end of this time, the bottle was opened and isopropanol was added to the contents thereof. The resulting mixture was filtered, and the precipitate collected was dried in a forced air oven at a temperature of 50° C. About 47 grams of copolymer were recovered. This represented a yield of about 47 percent of the theoretical yield of copolymer. The copolymer had a chlorine content of 48.28 percent by weight, indicating the presence of 42 percent by weight of combined vinyl chloride. The copolymer had a reduced viscosity of 0.21 in cyclohexanone at 30° C. using a solution of 0.2 gram of copolymer per 100 milliliters of solution.

Reduced viscosity ($I_R$) is a measure of the molecular weight of a polymer, and can be defined by the equation $$I_R = \frac{\frac{\Delta N}{N_o}}{C}$$

wherein $\Delta N$ is the difference in seconds between the flow-time of a solution of polymer through a capillary viscometer and the flow-time of the solvent, $N_o$ represents the flow-time of the solvent, and C is the concentration of polymer in said solution in grams per 100 ml. of solution.

EXAMPLE VI

Copolymerization of 2-(2',4',5'-Trichlorophenoxy)Ethyl Vinyl Ether With Vinyl Chloride To a nitrogen-purged 375-milliliter Pyrex polymerization bottle were charged 50 grams of 2-(2',4',5'-trichlorophenoxy)ethyl vinyl ether, 100 grams of anhydrous acetone and 1.0 gram of azo-bis-isobutyronitrile. After purging the bottle with nitrogen, the bottle was cooled in an ice-water-acetone bath. Following this, 50 grams of vinyl chloride were added thereto. The bottle was then capped and rocked in a water bath maintained at a temperature of 50° C. for 21.33 hours. At the end of this time, the bottle was opened and isopropanol was added to the contents thereof. The resulting mixture was filtered, and the precipitate collected was dried in a forced air oven at a temperature of 50° C. About 17.3 grams of copolymer were recovered. This represented a yield of about 17.3 percent of the theoretical yield of copolymer. The copolymer had a chlorine content of 53.0 percent by weight, indicating the presence of 77 percent by weight of combined vinyl chloride. The copolymer had a reduced viscosity of 0.12 in cyclohexanone at 30° C. using a solution of 0.2 gram of copolymer per 100 milliliters of solution.

EXAMPLE VII

*Copolymerization of 2-(3',5'-Dimethylphenoxy)Ethyl Vinyl Ether With Vinyl Chloride*

To a nitrogen-purged 375-milliliter Pyrex polymerization bottle were charged 50 grams of 2-(3',5'-dimethylphenoxy)ethyl vinyl ether, 100 grams of anhydrous acetone and 1.0 gram of azo-bis-isobutyronitrile. After purging the bottle with nitrogen, the bottle was cooled in an ice-water-acetone bath. Following this, 50 grams of vinyl chloride were added thereto. The bottle was then capped and rocked in a water bath maintained at a temperature of 50° C. for 12.16 hours. At the end of this time, the bottle was opened and isopropanol was added to the contents thereof. The resulting mixture was filtered, and the precipitate collected was dried in a forced air oven at a temperature of 50° C. About 26.2 grams of copolymer were recovered. This represented a yield of about 26.2 percent of the theoretical yield of copolymer. The copolymer had a chlorine content of 43.2 percent by weight, indicating the presence of 76 percent by weight of combined vinyl chloride.

EXAMPLE VIII

*Use of 2-(2',4',5'-Trichlorophenoxy)Ethyl Vinyl Ether as a Herbicide*

An admixture of 53 cc. of *Solium perenne* (perennial rye grass) seeds, 27 cc. of *Brassica pincea* var. *foliosa* (mustard) seeds, and 6100 cc. of sifted soil was prepared and rolled in a two-gallon container on a ball mill for approximately one-half hour (in order to insure uniform mixing of seeds and soil). At the end of this time, 70 cc. of the mixture were added to each of two 3" clay pots that had been previously filled with soil to about 1½ inches from their tops. After tamping the seed-soil mixture firmly, the pots were removed to a greenhouse and lightly watered. About two hours later, 25 cc. of a test emulsion containing 1000 p.p.m. of 2-(2',4',5'-trichlorophenoxy)ethyl vinyl ether were added to one of the pots. The emulsion employed was prepared by dissolving 1000 mg. of 2-(2',4',5'-trichlorophenoxy)ethyl vinyl ether in 50 ml. of an acetone-emulsifier solution [prepared by admixing 1000 ml. of acetone and 2.0 ml. of "Triton X-155" (an alkyl aryl polyether alcohol, manufactured by Rohm and Haas Co., Washington Square, Philadelphia, Pa.)] and diluting the resulting mixture with water. A similar emulsion free from 2-(2',4',5'-trichlorophenoxy)ethyl vinyl ether was added to the second pot which was employed as a control.

The pots were stored in a greenhouse and lightly watered for three weeks. At the end of this time, the pots were examined and it was found that no seedlings of the *Brassica pincea* var. *foliosa* species that had been treated with 2-(2',4',5'-trichlorophenoxy)ethyl vinyl ether had emerged, while all the seedlings in the control pot had emerged, and that the *Solium perenne* species that had been treated with 2-(2',4',5'-trichlorophenoxy)ethyl vinyl ether were stunted as compared to the species in the control pot.

EXAMPLE IX

*Use of 2-(3',5'-Dimethylphenoxy)Ethyl Vinyl Ether as a Herbicide*

An admixture of 53 cc. of *Solium perenne* (perennial rye grass) seeds, 27 cc. of *Brassica pincea* var. *foliosa* (mustard) seeds, and 6100 cc. of sifted soil was prepared and rolled in a two-gallon container on a ball mill for approximately one-half hour (in order to insure uniform mixing of seeds and soil). At the end of this time, 70 cc. of the mixture were added to each of two 3" clay pots that had been previously filled with soil to about 1½ inches from their tops. After tamping the seed-soil mixture firmly, the pots were removed to a greenhouse and lightly watered. About two hours later, 25 cc. of a test emulsion containing 1000 p.p.m. of 2-(3',5'-dimethylphenoxy)ethyl vinyl ether was added to one of the pots. The emulsion employed was prepared by dissolving 1000 mg. of 2-(3',5'-dimethylphenoxy)ethyl vinyl ether in 50 ml. of an acetone-emulsifier solution [prepared by admixing 1000 ml. of acetone and 2.0 ml. of "Triton X-155" (an alkyl aryl polyether alcohol, manufactured by Rohm and Haas Co., Washington Square, Philadelphia, Pa.)] and diluting the resulting mixture with water. A similar emulsion free from 2-(3',5'-dimethylphenoxy)ethyl vinyl ether was added to the second pot which was employed as a control.

The pots were stored in a greenhouse and lightly watered for three weeks. At the end of this time, the pots were examined and it was found that the *Brassica pincea* var. *foliosa* and the *Solium perenne* species that had been treated with 2-(3',5'-dimethylphenoxy)ethyl vinyl ether were stunted as compared to the species in the control pot.

EXAMPLE X

*Use of 2-(2',4'-Dichlorophenoxy)Ethyl Vinyl Ether as a Herbicide*

An admixture of 53 cc. of *Solium perenne* (perennial rye grass) seeds, 27 cc. of *Brassica pincea* var. *foliosa* (mustard) seeds, and 6100 cc. of sifted soil was prepared and rolled in a two-gallon container on a ball mill for approximately one-half hour (in order to insure uniform mixing of seeds and soil). At the end of this time, 70 cc. of the mixture were added to each of two 3" clay pots that had been previously filled with soil to about 1½ inches from their tops. After tamping the seed-soil mixture firmly, the pots were removed to a greenhouse and lightly watered. About two hours later, 25 cc. of a test emulsion containing 1000 p.p.m. of 2-(2',4'-dichlorophenoxy)ethyl vinyl ether was added to one of the pots. The emulsion employed was prepared by dissolving 1000 mg. of 2-(2',4'-dichlorophenoxy)ethyl vinyl ether in 50 ml. of an acetone-emulsifier solution [prepared by admixing 1000 ml. of acetone and 2.0 ml. of "Triton X-155" (an alkyl aryl polyether alcohol, manufactured by Rohm and Haas Co., Washington Square, Philadelphia, Pa.)] and diluting the resulting mixture with water. A similar emulsion free from 2-(2',4'-dichlorophenoxy)ethyl vinyl ether was added to the second pot which was employed as a control.

The pots were stored in a greenhouse and lightly watered for three weeks. At the end of this time, the pots were examined and it was found that no seedlings of the *Brassica pincea* var. *foliosa* species that had been treated with 2 - (2',4' - dichlorophenoxy)ethyl vinyl ether had emerged, while all the seedlings in the control pot had emerged, and that the *Solium perenne* species that had been treated with 2-(2',4'-dichlorophenoxy)ethyl vinyl ether were stunted as compared to the species in the control pot.

What is claimed is:

1. A copolymer of 2-(2',4'-dichlorophenoxy)ethyl vinyl ether and vinyl chloride.
2. A copolymer of 2-(2',4',5'-trichlorophenoxy)ethyl vinyl ether and vinyl chloride.
3. A copolymer of 2-(3',5'-dimethylphenoxy)ethyl vinyl ether and vinyl chloride.

References Cited in the file of this patent

UNITED STATES PATENTS 2,244,308    Moyle   ---------------- June 3, 1941
2,515,164    Sargent   --------------- July 11, 1950